United States Patent
Lee

(10) Patent No.: US 10,520,999 B1
(45) Date of Patent: Dec. 31, 2019

(54) MODULAR SLED FOR COOPERATIVE POWER MANAGEMENT AND PHYSICAL COMBINATION BETWEEN A MOBILE DEVICE AND ASSOCIATED PERIPHERAL DEVICES

(71) Applicant: Hanjin Lee, Skillman, NJ (US)

(72) Inventor: Hanjin Lee, Skillman, NJ (US)

(73) Assignee: KoamTac, Inc., Princeton, NJ (US)

( * ) Notice: Subject to any disclaimer, the term of this patent is extended or adjusted under 35 U.S.C. 154(b) by 193 days.

(21) Appl. No.: 15/663,841

(22) Filed: Jul. 31, 2017

Related U.S. Application Data

(60) Provisional application No. 62/427,961, filed on Nov. 30, 2016.

(51) Int. Cl.
| | | |
|---|---|---|
| *G06F 1/00* | (2006.01) | |
| *G06F 1/26* | (2006.01) | |
| *G06F 1/3287* | (2019.01) | |
| *G06F 1/3296* | (2019.01) | |
| *G06F 1/3212* | (2019.01) | |
| *G06K 7/10* | (2006.01) | |

(52) U.S. Cl.
CPC ............ *G06F 1/266* (2013.01); *G06F 1/3212* (2013.01); *G06F 1/3287* (2013.01); *G06F 1/3296* (2013.01); *G06K 7/10762* (2013.01)

(58) Field of Classification Search
CPC ....................................................... G06F 1/266
See application file for complete search history.

(56) References Cited

U.S. PATENT DOCUMENTS

| | | | | |
|---|---|---|---|---|
| RE40,421 E | * | 7/2008 | Osborn ................. | G06F 1/1632 710/303 |
| 8,346,979 B1 | * | 1/2013 | Lee ....................... | G06F 1/1632 235/449 |
| 2009/0066294 A1 | * | 3/2009 | Sabram ................. | H02J 7/0013 320/137 |
| 2013/0109316 A1 | * | 5/2013 | Lee ....................... | H04M 1/725 455/41.2 |
| 2014/0141838 A1 | * | 5/2014 | Cai ................... | H04M 1/72575 455/557 |

* cited by examiner

*Primary Examiner* — Mohammed H Rehman
(74) *Attorney, Agent, or Firm* — Robert Gorman; Gorman Law Offices

(57) ABSTRACT

The present invention relates to an apparatus and method offering a specialized modular sled systems for combination, both in a physically proximate sense, and power usage-wise, mobile devices with peripheral devices without the need for cables, and with structural capabilities that offer the ability for a user to employ the same in substantially simultaneous fashion through a consolidated physical integration that eliminates uneven and/or problematic charging of the same.

4 Claims, 12 Drawing Sheets

MODULAR SLED FOR COOPERATIVE POWER MANAGEMENT AND PHYSICAL COMBINATION BETWEEN A MOBILE DEVICE AND ASSOCIATED PERIPHERAL DEVICES

1. FIELD OF THE INVENTION

The present invention relates to a device for operative physical cooperation between a mobile devices and associated peripherals, and improved methods for both physically combining the above and for managing power dynamics of the same.

2. DISCUSSION OF THE RELATED ART

Mobile devices are becoming widely used as more than mere communication or media devices, and are used for Internet of Things (IoT) applications, and additional purposes that may be achieved through the use of special purpose peripherals that can be connected thereto.

However, when the mobile terminal is connected to certain peripheral devices, effective operation between the same is often limited by the fact that it is difficult to use the peripheral devices at the same time, especially given the need to maintain even, cooperative charging ranges during the course of operation by an end user.

Current approaches for using any of the above devices have been hitherto limited to inconvenient, disparate charging connections for the simultaneous use and connection of the peripheral devices.

SUMMARY OF THE INVENTION

The present invention relates to a mobile device and peripheral device consolidation system for providing improved physical combination, as well as cooperative power allocation and charging between the same. More particularly, the present invention is directed to a system and method for providing charging capabilities that enable a mobile device to readily and conveniently pair with one or more peripheral devices, in a way that substantially obviates limitations of the related art, such as through uneven power usage and/or power charging.

The proposed invention therefore relates to a novel approach of augmenting the use of mobile devices with peripheral add-on devices such as compact bar code scanners, passport readers, magnetic strip readers (MSRs), and virtually any other manner of compact peripheral device. When a peripheral device needs to be used with a mobile device, the present invention thusly provides a physical and electronic connectivity platform or "sled" that can physically attach any of the aforementioned to each other in a convenient, modular fashion. In doing so, the present inventive approach utilizes a rigid backbone that can attach a peripheral device in a streamlined, consolidated fashion readily to the back of a mobile device, with a cooperative, intelligent charging being afforded between all devices.

Furthermore, in one optional instantiation of the aforementioned peripheral device, provision is made for an illustrative passport reader to be an innovative passport reader that can, in addition to barcode reading of passports, perform specialized functions like variable position Optical Character recognition (OCR), symbol recognition, and anti-fraud mark verification of visa stamps.

Accordingly, the present invention offers for the following beneficial advances relating to providing interoperability between a mobile device and a peripheral device through: (1) provision of a "sled" that comprises a rigid backbone, one or more mobile device and/or peripheral device case(s) or attachment means, a power source and a physical connector for connecting the same; (2) provision of a smart power regulator; (3) provision of the sled with physical capacity for insertion of optional peripheral device such as a passport reader, especially for the inventive variable position passport/visa reader; (4) inherent modularity for connection of each of the above-referenced mobile and/or peripheral device(s) via a charging connection, such as the smart power regulator; (5) enabling a user, through the inventive architecture, to change smart phones/cell phones (as well as peripherals such as the passport reader) periodically, without replacing the inventive sled; and (6) provision of a supplemental power (battery) pack within sled that allows, through conjunction with the innovative smart power regulator, a user to cooperatively charge, the mobile device and the peripheral device in an even, regulated fashion.

According to one embodiment of the inventive modular approach may therefore employ five component parts: (1) a rigid backbone; (2) one or more device(s) and/or peripheral device case(s); (3) a smart power regulator; (4) a supplemental power (battery) pack; and (5) a physical connector for connecting all of the same physically together. This modularity can facilitate ongoing use of the system with little to no modifications in the case of where a user desires to switch or replace a given mobile device. Moreover, the actual design of the modular sled is such that it can be used on all types of mobile devices, without blocking the mobile device communications and/or charging ports, and also supports all manner of native services, even those from specialized smart devices, such as devices made by from Apple, Inc. of Cupertino, Calif. When combining the same, the present invention also teaches how to stack up optional modules, similar to the concept of interlocking plastic building blocks, which is an advancement over prior functional designs. Hence, provision is made for the ability to physically combine and electronically connect diverse associated peripheral devices with any type of mobile device(s) is provided within the scope of the present invention. Other devices provide, at best a limited expansion path. The present invention teaches how to attach unlimited number of optional modules such as passport reader, finger print reader, and payment device, etc.

Supplemental to this, additional provision is made for combining the same with an innovative variable position passport/visa reader as described hereafter, wherein an innovative passport reading guide (slot) which can adjust the height (depth and/or outward extending position of the reading guide slot depending on the printed OCR height required for any given visa or passport text.

The inventive approach therefore overcomes limitations in the prior art as follows. Unlike known devices that provide limited support that is tied to a specific smart phone or tablet, the present invention can support all smart phones and/or tablets via a physical connector as well as with provision for electronic connectivity through wireless technology and the like.

Additionally, the present invention provides for seamless, consolidated, yet equitable power usage and charging of each given device as combined with each other. To this end, the present invention overcomes the aforementioned and other disadvantages inherent in the prior art, especially regarding unavailable and/or uneven power distribution between mobile devices and/or associated peripheral devices. The present invention provides for the simultaneous charging of smart devices, sled, and optional modules such as the novel passport reader in parallel, something not possible with known approaches. This advantage is realized through the use of inductive charging between the given smart device and optional modules via the novel sled. Within the same dynamic, the present invention also provides for battery power sharing between a given smart device, sled and optional external battery pack.

The present invention also provides for an innovative feature whereby a user can define additional buttons on the smart device case (physical connector) and connect to a sled, as well as for innovative speeding up of the normal rebooting process by introducing a novel hibernation feature.

Technical subject matters to be realized by embodiments of the present invention are not limited to the following technical subject matters, and other technical subject matters not mentioned in the following description may be easily appreciated by those skilled in the art to which the present invention pertains, without difficulty. Accordingly, additional advantages, objects, and features of the invention will be set forth in part in the description which follows and in part will become apparent to those having ordinary skill in the art upon examination of the following may be learned from practice of the invention. The objectives and other advantages of the invention may be realized and attained by the structure particularly pointed out in the written description and claims hereof as well as the appended drawings. It is therefore to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in, and constitute a part of this application, illustrate embodiment(s) of the invention and together with the description serve to explain the principle of the invention. In the drawings.

DETAILED DESCRIPTION OF THE INVENTION

Figure 1:
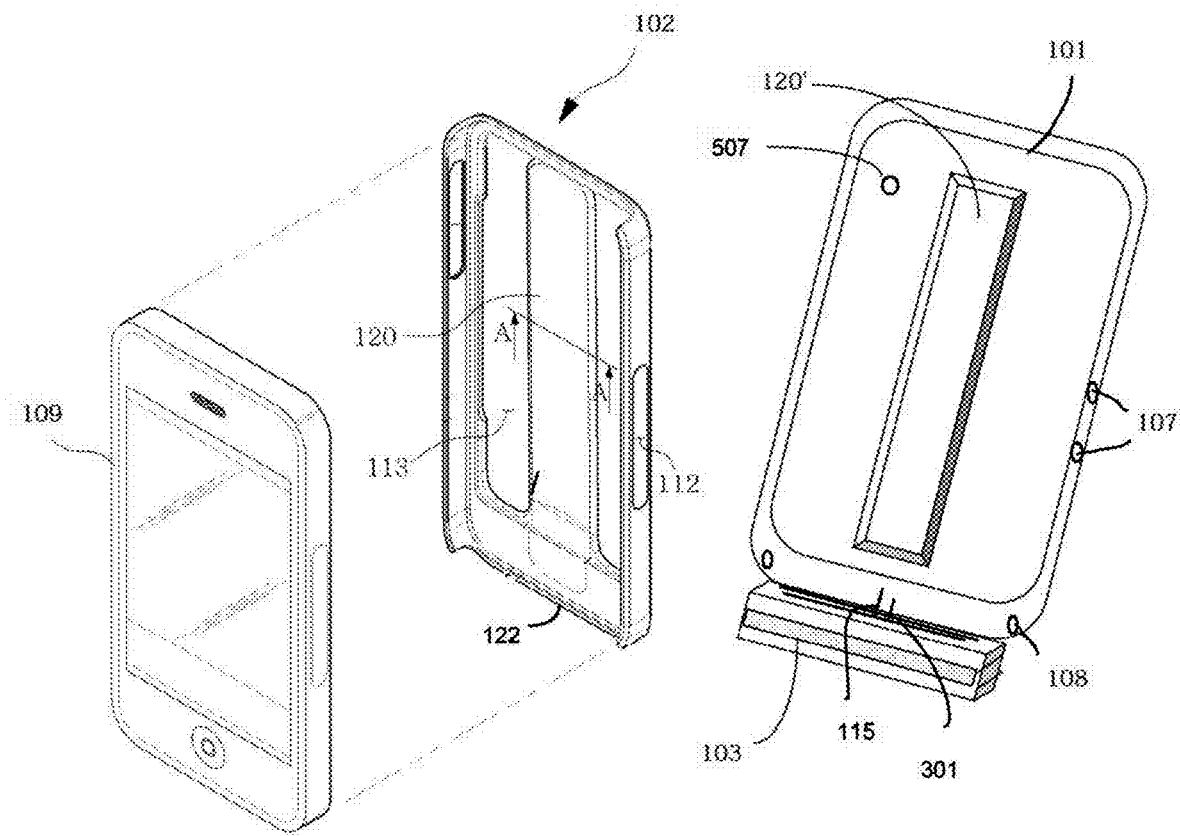
FIG. 1 depicts an illustrative exploded view of both sides of the inventive sled with devices, according to one embodiment of the present invention.

To achieve the objects and other advantages and, in accordance with the purpose of the invention as embodied and broadly described herein, the proposed invention relates at its broadest level, to a method and apparatus whereby improved interoperability between the peripheral device and a mobile device is provided according to the following which is described as follows.

Known devices and systems provide limited charging capability. This invention provides for balancing the battery level in a target smart device, sled and external battery in order to prevent possible battery drain on smart device or sled, more particularly because it is desirable that both the given smart device and sled batteries drain out in a respectively simultaneous, even fashion in order to maximize the operation time of the overall system for a user. In doing so, the present invention teaches various charging methods, including charging though a USB port on the innovative sled, or through other novel ways, such as through charging contact via the inventive sled and/or smart phone charging contact and external battery charging. The present invention also teaches how to detect and charge at least four (4) combinations of smart phone/tablet/iOS/Android devices for a sled.

In one broad embodiment, the present invention may therefore include a modular sled for cooperative power management and physical combination between a mobile device and associated peripheral devices, the modular sled comprising: (a) a rigid backbone structure; (b) a power module; (c) an intelligent cooperative power regulator for charging of, and drawing of, power from said power module, the intelligent cooperative power regulator having a power connectivity module for simultaneous cooperative power connection between said mobile device and said at least one associate peripheral device; (d) wherein said backbone structure includes a means for attachment of a mobile device and a separate means of attachment for at least one associated peripheral device. Additionally, the modular sled may be further such that the power connectivity module includes: (a) special purpose circuitry for receiving and identifying at least one mobile device selected from various mobile devices; (b) special purpose circuitry for identifying a charging path of the at least one mobile device; (c) special purpose circuitry for identifying battery capacity of the at least one mobile device; (d) converting signals received from the: special purpose circuitry for receiving and identifying at least one mobile device selected from various mobile devices; special purpose circuitry for identifying a charging path of said at least one mobile device; special purpose circuitry for identifying battery capacity of said at least one mobile device; into special purpose instructions for cooperative power management between said mobile device and said at least one associated peripheral device via said intelligent cooperative power regulator.

In other embodiments, the present invention may provide for additional novel associated peripheral devices, such as an adjustable position passport reader with variable Optical Character recognition (OCR) structure that can accommodate text that has been printed or otherwise situated across different positions on a given passbook page. Other convenient, novel features are also provided for herein, including provision of user defined mobile device case buttons and a novel hibernation module.

Reference will now be made in detail to the illustrative embodiments of the present invention, examples of which are illustrated in the accompanying drawings. Wherever possible, the same reference numbers will be used throughout the drawings to refer to the same or like parts. Constituent components and operations of the present invention shown in the drawings will be disclosed only for illustrative purposes of the present invention, such that technical spirit, important constructions and operations of the present invention are not limited to only the following embodiments, and can also be applied to other embodiments.

FIG. 1. Modular Sled

FIG. 1 illustrates an example of one illustrative embodiment of the inventive mobile device and peripheral device consolidation system for providing improved interoperability between a mobile device and at least one peripheral device. As depicted therein, an inherent part of the modular sled 101 aspect of the present invention comprises (at least one) peripheral device 103 physically consolidated or connected with mobile device 109 via an attachment means 102 for attaching the at least one peripheral device 103 to mobile device 109, as well as provides for electronic connection between the respective devices, as described hereafter. Peripheral device 103 of modular sled 101 may be of any type of at least one of the following peripheral devices comprising: compact bar code readers, MSRs, charging bases, IC card readers, peripheral device triggers, or RFID tag readers, but for purposes of illustration in this particular example, a mobile device with one associate peripheral device is shown in FIG. 1. Those skilled in the art will appreciate that various modifications, additions and substitutions are possible from this description, but in general, mobile device 109 is of the type chosen from the groups comprising mobile phones, smart phones, PDAs, and the like. In any case, mobile device 109 may be connected in a wired fashion (not depicted), or alternatively, in a wireless fashion to the peripheral device 103 of the inventive sled through a protocol such as the illustrative Bluetooth® protocol.

More specifically, FIG. 1 details exploded views of the inventive sled when it is assembled with smart device case and external module. As detailed, smart device case 102 is attached to the top of sled 101. Smart device case 102 may have additional buttons 112/302 such as a scan button and/or up/down buttons to provide additional convenience to users instead of using buttons 107 on sled 101. Optional modules 103, such as external battery pack, finger print reader, passport reader, RFID reader, and credit card reader would be illustratively attached to the bottom or elsewhere on sled 101. Sled 101 and smart device case 102 would be connected through connector 120' on sled 101 and connector 120 on the smart device case 102. Sled 101 and optional module 103 would be physically connected through (physical) connector 115 on sled 101 and mating (physical) connector 105 (respective connectors not fully shown) on the optional module 103. Sled 101 has a battery case with cover (not depicted) on the side which enables users to replace the battery easily. Alternatively, smart device case 102 and optional module(s) 103 would be attached to sled 101 using screws, adhesive materials such as double side tape, and/or hook and loop materials, etc. In one embodiment, smart device case 102 can have a connector 301 (partially depicted therein) to provide electrical connection, in conjunction with (physical) connector 115 between sled 101 and smart device 109. However, in an alternative embodiment, smart device case 102 has separate charging contact 122 or USB port for charging cradle or USB charging.

As will be shown hereafter by way of additional FIGS. 2-11, are various particulars of the overall innovative system design and assembly. This modular barcode sled is designed to attach smart device (either smart phone or tablet) case either physically using connector or logically using wireless interface. A modular sled also accommodates external modules such as external battery pack, RFID module, passport reader, finger print reader, and credit card reader using physical connector or wireless interface. It also provides a mechanism to charge sled, optional modules and smart device simultaneously if they are physically connected or integrated inductive wireless charging capability. To that end, each respective figure below details one aspect thereof.

Figure 2:
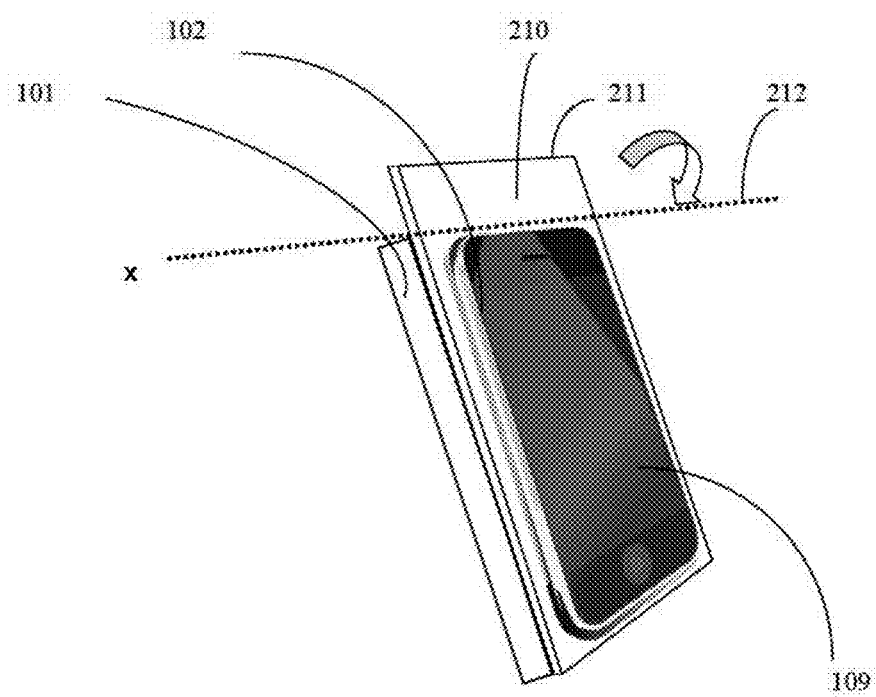
FIG. 2 depicts an illustrative mobile device case according to one embodiment of the present invention.

FIG. 2. Smart Device Case Design

The smart device case 102 can have various form factors. The following figure teaches one of the methods to insert smart device 109 into the smart device case 102. The smart device case 102 can be one piece or multiple pieces. The following illustrative smart device case 102 has two pieces: plastic portion 210 to be securely mounted on sled 101 and an optional flexible case 210, illustratively a silicon case which can be folded about an axis x from 211 position to 212 position so that smart device 201 can be inserted into the smart device case 102.

Figure 3A:
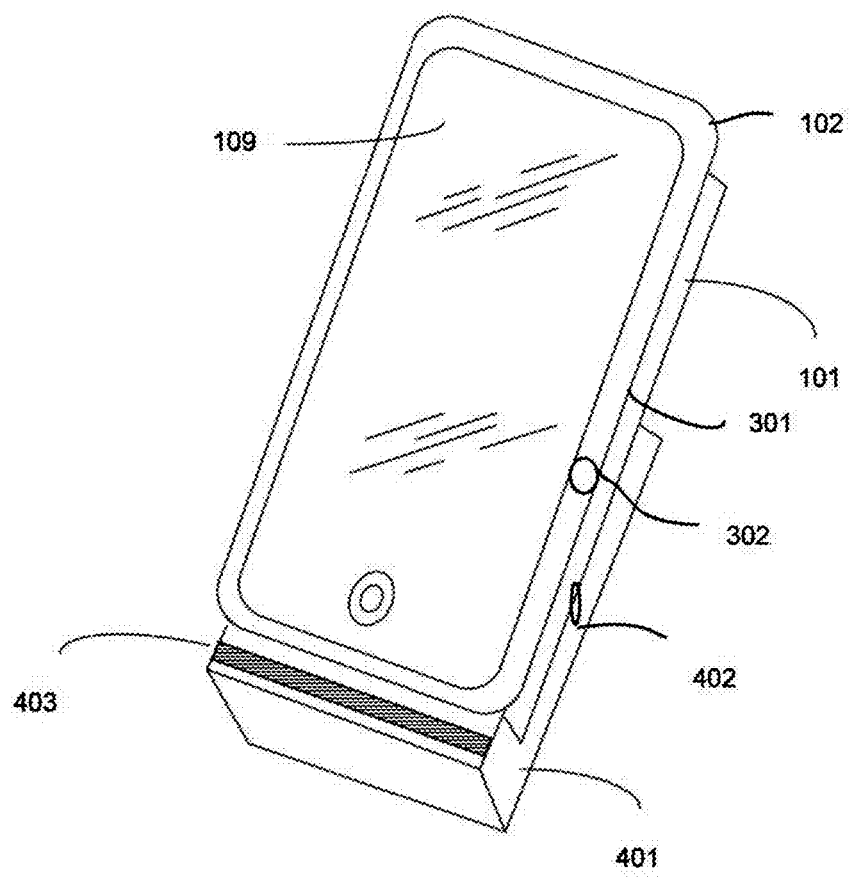
FIGS. 3A and 3B depict, respectively, and offset perspective view and side profile view of an illustrative optional novel module (passport reader and additional battery) attached within the overall system, according to one embodiment of the present invention.
Figure 3B:
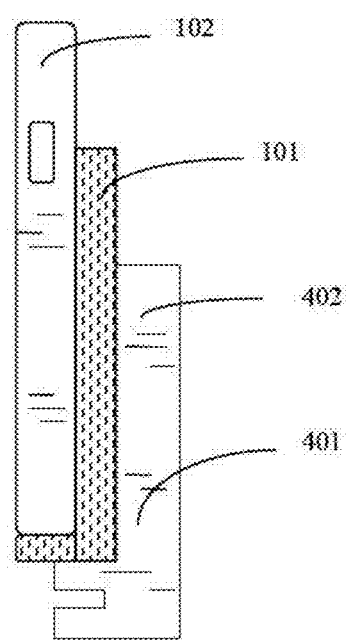

FIGS. 3A-3B. Smart Device Case with Multiple Optional Modules

In one alternative embodiment depicted in FIGS. 3A-3B, the present invention can also provide for an electrical connection therebetween, including between multiple optional modules 103, both for power (battery distribution purposes, and for signal (control) purposes, such as where smart device case 102 includes additional buttons 112/302 for control, the pathway for which is provided via said electrical connector 301. Through this electrical connector 301 is essentially an electronic circuit with an electrical interface for reception and transmission of electrical signals from the associated electronic devices, such that multiple optional modules 103 can be attached to sled 101. For example, external battery pack 402 as depicted, is attached to sled 101, while at the same time passport reader 401 with reader slot 403, is attached to the external battery pack 402.

Figure 4A:
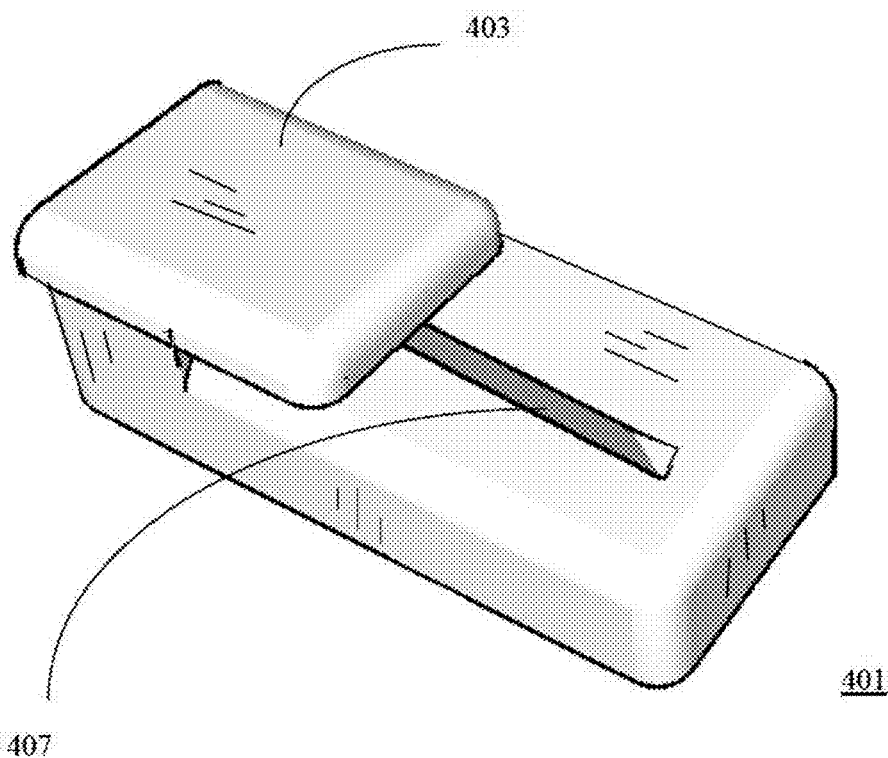
FIGS. 4A-4C depict, respectively an offset perspective view (4A) and two side profile views (4B and 4C) of a novel variable position passport/visa reader according to one embodiment of the present invention.
Figure 4B:
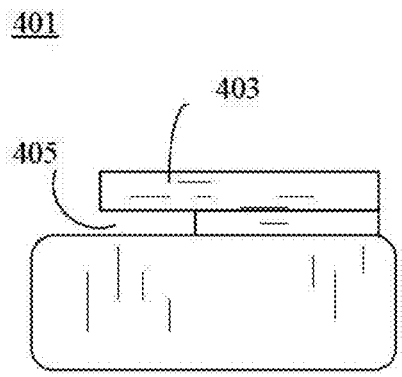
Figure 4C:
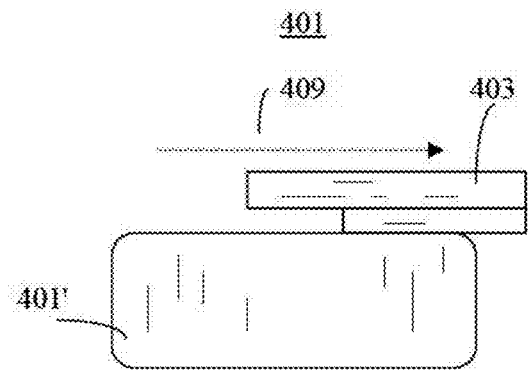

FIGS. 4A-4C. Optional Module (Variable, Adjustable Slot Passport Reader)

Optional passport reader module 401 has charging contact pins 402 and LED 403 to indicate battery level, connecting status and reading result. Passport reader module 401 has variable, adjustable reading guide 403 to support differing OCR height requirements corresponding to various character placements on passbook pages. A given passport OCR height may be set to a predetermined standard, but the visa(s) therein can be attached to the passport as a sticker and the OCR and any innovative symbol recognition height therefore varies by countries and according to how the consular, diplomatic and/or immigration officer applied the visa sticker(s). Accordingly, as detailed in one illustrative embodiment shown in FIGS. 4A-4C, passport reader module 401 has variable, adjustable reading guide 403 that can optionally be slid along a track 407 to accommodate the various heights at which a "read" must be accomplished for a given passport page. FIGS. 4B and 4C detail, respectively, a side profile depiction of passport reader module 401, wherein FIG. 4B shows the same, with adjustable reading guide 403 in a resident position, and in FIG. 4C, in an adjusted, extended position wherein adjustable reading guide 403 has translated laterally along axis or line of translation 409, relative to main body portion 401' of passport reader module 401. In either case, a reading head, such as an OCR scanner or reader is provided, either under an overhang portion of adjustable reading guide 403 at, illustratively 405, or otherwise disposed on or proximate to main body portion 401' of passport reader module 401. Regardless of the exact configuration, the variable positioning feature adjustable of adjustable reading guide 403 is both inherently novel and useful for field applications, particularly within the context of the overall inventive framework as described herein.

Figure 5:
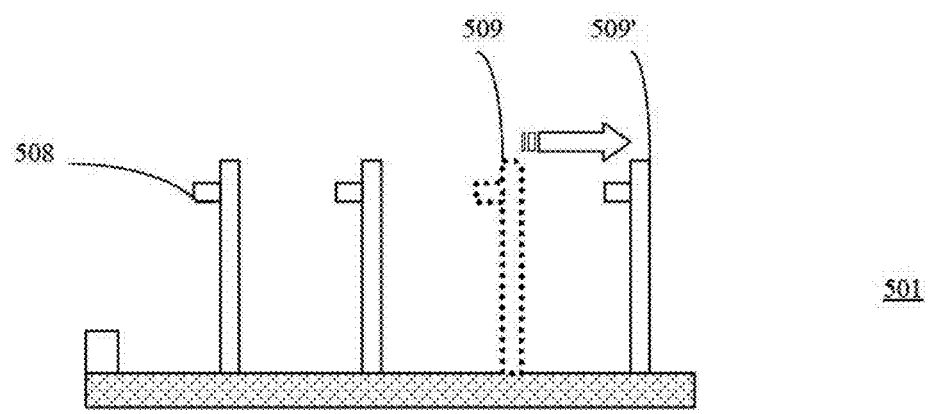
FIG. 5 depicts an illustrative stacking, position variable, charging cradle according to one embodiment of the present invention.

FIG. 5. Charging Cradle Drawing

Charging cradle 501 has a mechanism for holding sled 101, smart device case 102, and optional modules 103. Charging cradle 501 has a charging contact 508 to supply power to sled 101 through charging pogo pin 507. An optional provision is made for multiple device bundles to be charged at the same time, such that a stack can be provided between charging braces 509, which can also, in one optional embodiment, be moved along a track (not shown) or other mechanical movable retention module so a to permit greater space between a given brace 509 and an adjacent brace, so that a horizontal translation to a resulting position at 509' affords increased space therebetween.

FIGS. 6-11: Sled Innovative Operation Features

Figure 6:
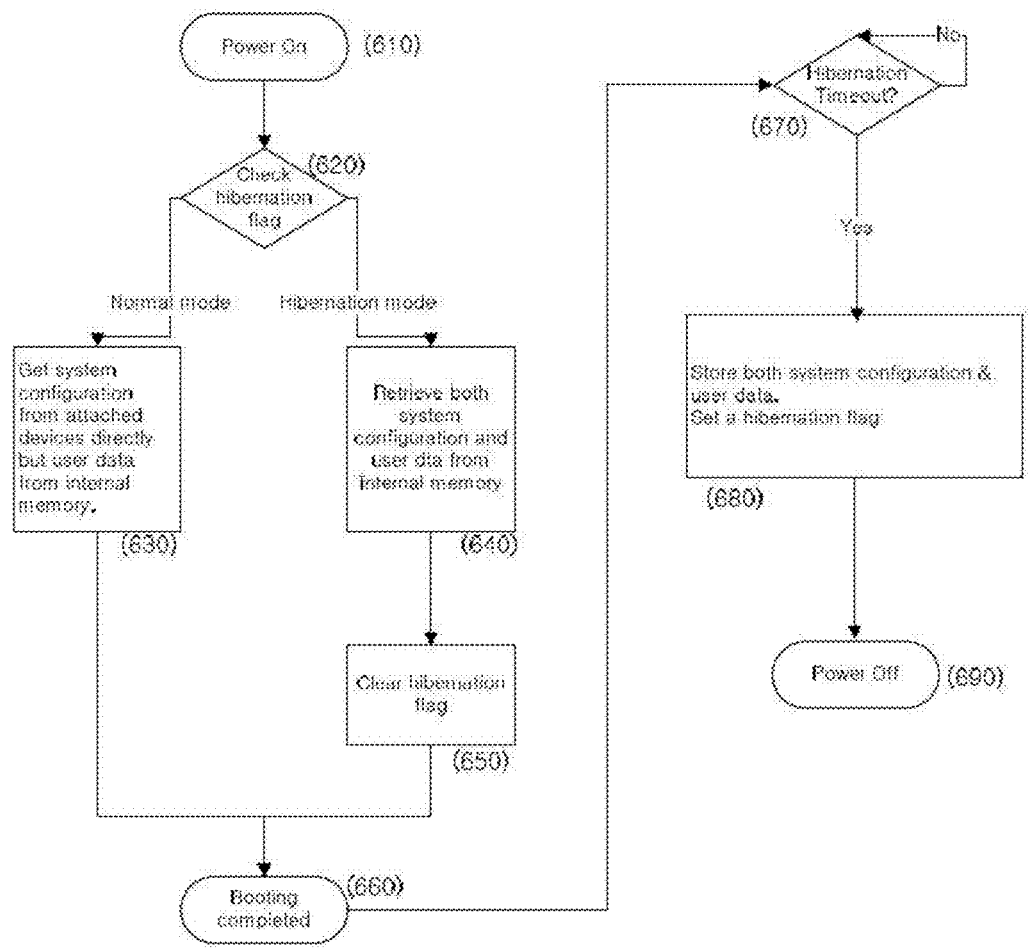
FIG. 6 depicts an illustrative flow diagram depicting special purpose instructions for use in provision of a hibernation (power saving) feature according to one embodiment of the present invention.

1. FIG. 6—Software Power Off and Hibernation

The modular sled further includes a hibernation module, which includes circuitry and a memory module (neither of which is specifically depicted), and provides a way to minimize power consumption of sled 101 and enables fast booting through the hibernation module and method. Specifically, sled 101 enters a hibernation mode once a predefined timeout has been reached, and boots faster, saving time when compared with a normal booting that occurs for a given device upon executing a wake up sequence. FIG. 6 explains the overall hibernation procedure in one illustrative embodiment from the power on to power off stages. As detailed therein sled 101 checks the hibernation flag 620 upon power on 610. Essentially, a hibernation mode is set by a user as an alternative to powering off, and this election results in the hibernation flag being generated. In normal mode 630, sled 101 request system configuration information to barcode module 111 (not depicted) or other similar module, and other attached optional modules 103. Sled 101 also retrieves user data from internal memory. If a hibernation mode flag is set, sled 101 requests both system configuration and user data from the internal memory at 640, and the resets the hibernation flag at 650. Once booting has completed at 660, sled 101 checks hibernation timeout period 670 and stores system, as well as user data, into internal memory and sets hibernation flag 680 if hibernation timeout has reached. Accordingly, FIG. 6 therefore details an inventive hibernation procedure from power on, to power off, which is a novel feature distinct from the hibernation mode normally found on computers, tablets, cell phones, etc., and entails an innovative approach to a centralized power saving feature that can control and cooperatively preserve power equally and in unison amongst disparate devices such as smart device 109, optional modules 103, etc.

2. Sled and Smartphone/Tablet Charging Method

Another innovative aspect of the present invention relates to the ability to charge both sled 101 and smart device 109 (and as needed, optional modules 103) from a single power source either manually or automatically. In terms of the above hibernation and power saving features discussed immediately above, the single power source is similar, inasmuch as it pertains to the novel centrality of sled 101 as a focus point for power infrastructure that can enable even, cooperative powering of all the associated devices, such that one device does not become disproportionately drained of power, thereby impacting the utility of the other associated devices, in terms of power availability and usage. Thus, with cross reference to several of the above-referenced figures, the following is noted in one illustrative embodiment: sled 101 has a USB port 122 for charging both sled 101 and smart device 201, and charging contact points 507 for a charging cradle 501, while smart device case 102 has the charging contact point 108 for a charging cradle 501. Within this, sled 101 can be attached to an optional external battery pack 402, and this optional battery pack can, through the novel circuitry of sled 101, be used to power any given associated device that is connected to sled 101, regardless of whether it is smart device 109, optional modules 103, etc. In doing so, the novel internal circuitry of sled 101 can detect the type of smart device 201 be used or otherwise associated with sled 101 at any given time, as further illustratively details in FIG. 9 hereafter.

Figure 7:
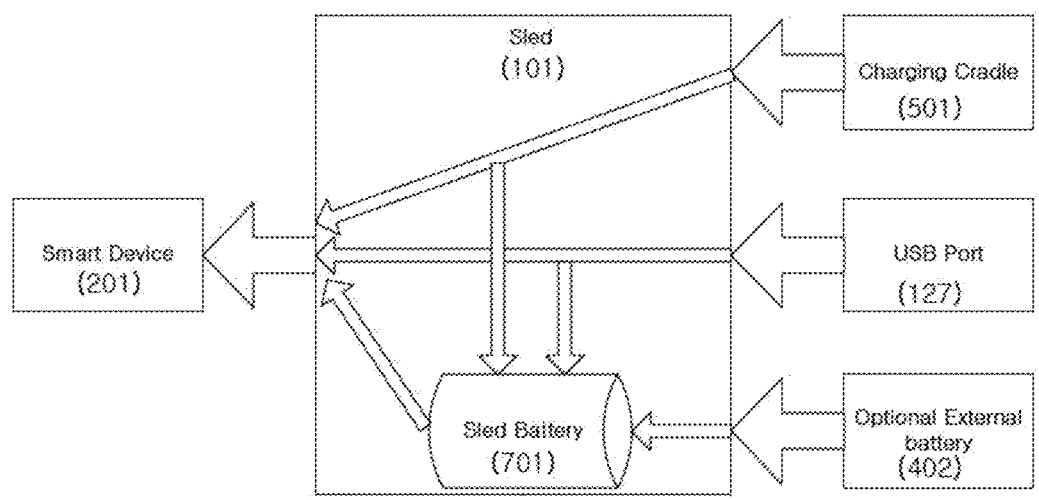
FIG. 7 depicts an illustrative system charging path according to one embodiment of the present invention.

FIG. 7. System Charging Path

Figure 9:
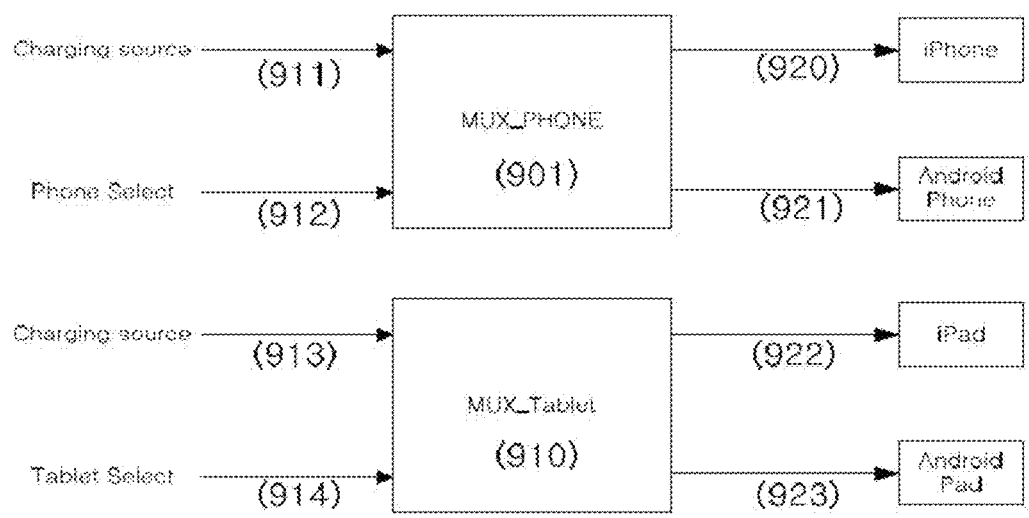
FIG. 9 depicts an illustrative selection process and circuitry for selecting a charging path of a mobile and/or associated device according to one embodiment of the present invention.

FIG. 7 shows overall sled 101 and smart device 201 charging path, where it is detailed that sled 101 selects a charging path to iOS device or Android/Windows device as also discussed hereafter in FIG. 9. This novel circuitry can be employed to constantly, or selectively query associated devices for their respective battery status, which the given software on the device (illustratively smart device 201, which reports smart device 201 battery status) automatically starts and stops smart device 201 charging from sled 101 own respective internal battery 701. Sled 101 therefore automatically controls sled 101 internal battery 701 charging from external battery 402, and by extension the battery of other associated devices. Note that additional charging and power pathways are provided via the aforementioned USB port 122 and charging cradle 501 similarly.

Figure 8:
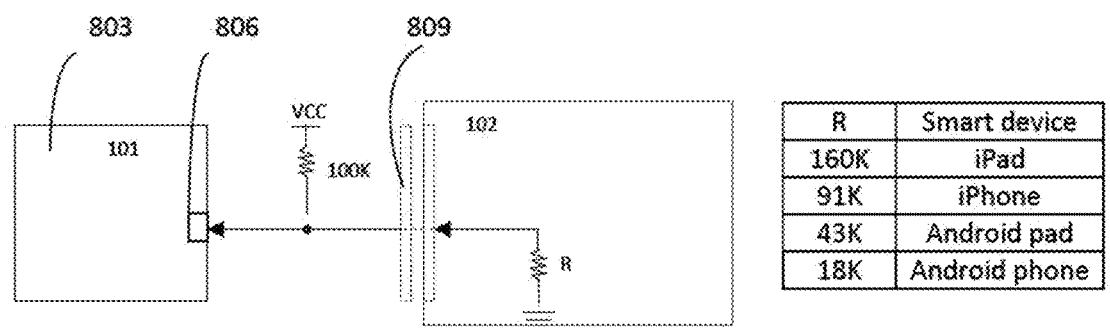
FIG. 8 depicts an illustrative mobile and/or associated device detection method according to one embodiment of the present invention.

FIG. 8. Smart Device Detection Method

FIG. 8 illustratively depicts the novel smart device detection apparatus and method, an approach to detect and identify a given smart device type, i.e., whether iOS or Android/Windows. As depicted therein, FIG. 8 shows a special purpose MCU (microcontroller) of sled 101 which, instead of merely registering common signals as known in other MCUs, the special purpose MCU 803 prompts for, and consequently detects, the register value of installed on smart device case 102 at ADC (analog digital converter) port 806, after current has been passed from the board to board connectors 809 connected to smart device case 102

FIG. 9. Select Charging Path

The present invention provides for an intelligent cooperative power regulator as discussed below in regards to FIG. 9, and later, FIGS. 10 and 11. FIG. 9 accordingly details how to select charging path of smart device, such that specifically when a modern smart devices smart phone and tablet use different charging method, a tablet normally requires higher charging current that smart phone, and likewise, an Apple iOS device and Android device also use different charging method. Therefore, there are four different charging methods 920, 921, 922, 923 used in sled 101, stemming respectively from phone selection step 912, charging source 911 via phone multiplexer 901 or from tablet selection step 914, charging source 913 via tablet multiplexer 910. The four different charging methods 920, 921, 922, 923 used in sled 101 are respectively for different devices, such as the illustrative iPhone®, Android® phone, iPad®, or Android® Pad.

Figure 10:
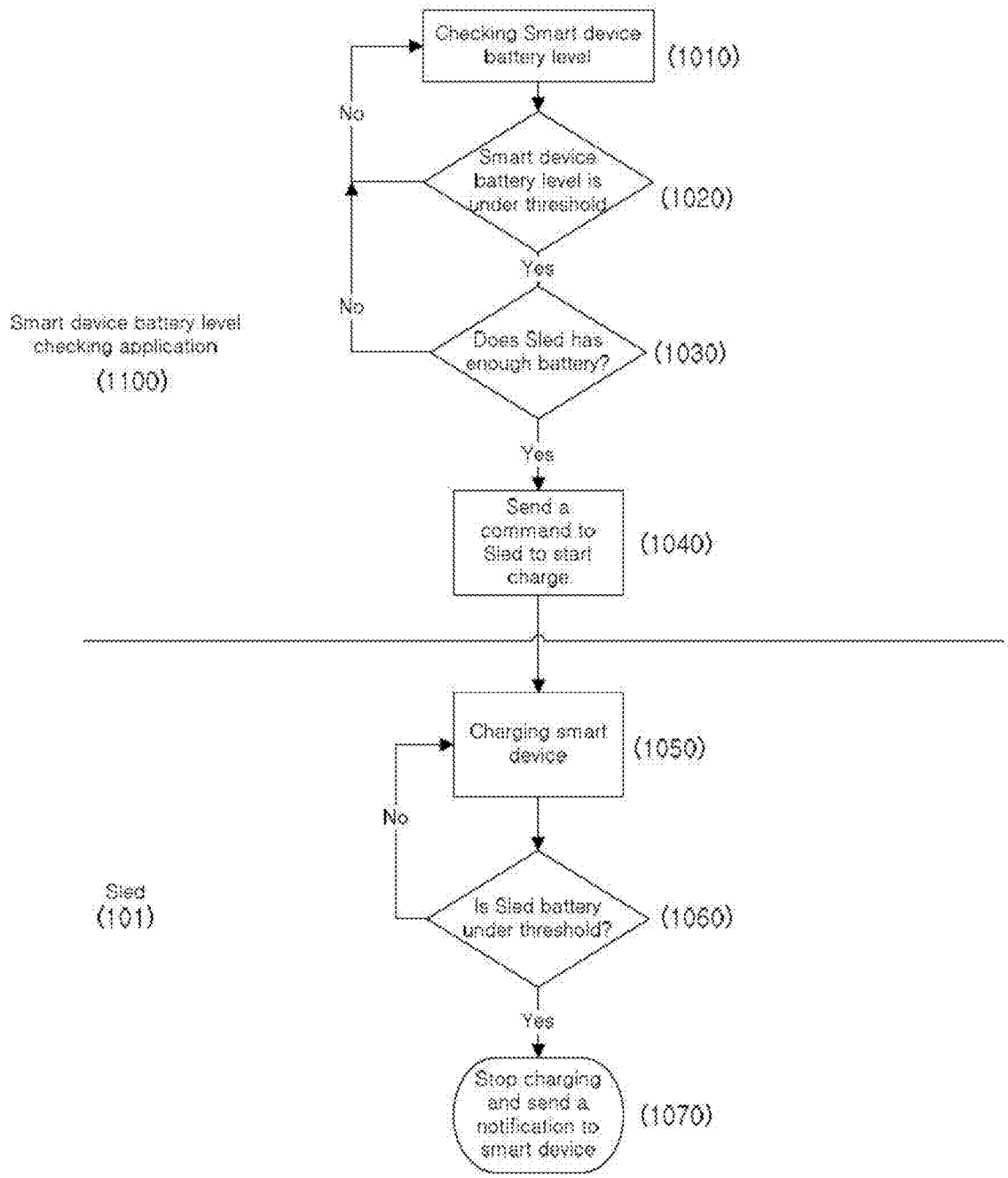
FIG. 10 depicts an illustrative flow diagram depicting special purpose instructions for use in provision of the smart power regulation (automatic charging feature) feature according to one embodiment of the present invention.

FIG. 10. Automatic Charging/Power Balancing Module

As illustratively depicted in the flow diagram of FIG. 10, the present invention further includes a power balancing module as part of the intelligent cooperative power regulator, the power balancing module including circuitry for balancing a smart device battery power level, a sled battery power level and an external battery power level to prevent uneven battery drain. The present invention provides for the simultaneous charging of smart devices, sled, and optional modules such as the novel passport reader in parallel, something not possible with known approaches. This advantage is realized through the use of inductive charging between the given smart device and optional modules via the novel sled. Within the same dynamic, the present invention also provides for battery power sharing between a given smart device, sled and optional external battery pack.

Therefore, the present invention additionally teaches how to balance the battery level in smart device, sled and external battery to prevent possible battery drain on smart device or sled. It is desirable that both smart device and sled batteries drain out simultaneously to maximize the operation time. Accordingly, FIG. 10 details how to control smart device charging from internal battery automatically. This is accomplished by special purpose circuitry: (i) for receiving and identifying at least one mobile device selected from various mobile devices; (ii) for identifying a charging path of the at least one mobile device; (iii) for identifying battery capacity of the at least one mobile device. All of this is translated (converted) into special purpose instructions for cooperative power management between the mobile device and the associated peripheral device via the intelligent cooperative power regulator. Specifically, smart device 109/201 has a battery checking application 1100 that runs on a target smart device periodically, utilizing, in one embodiment, native circuitry differently, in a novel way (or alternatively with dedicated power checking circuitry provided within sled 101 electronics), as a battery checking circuit, checking the battery level 1010. If a target smart device smart device battery level becomes under threshold 1020 and sled 101 has enough battery to share with smart device 1030, then battery checking application 1100 requests to charge smart device battery to sled 1040, which is then charged at 1050. Sled 101 charges a target smart device upon receiving a request from battery checking application 1100 as long as sled 101 battery level is above threshold 1060, and once charging is stopped, a notification is sent to smart device 109/201 at 1070.

Figure 11:
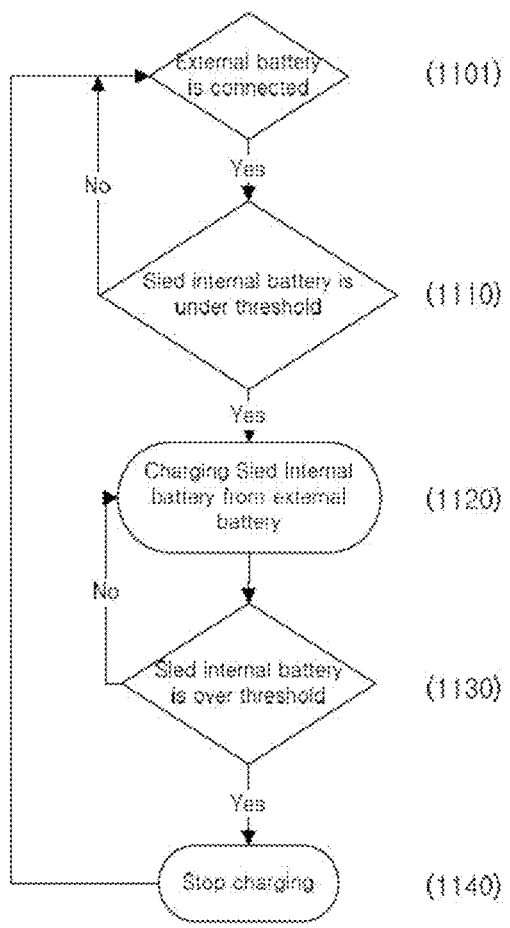
FIG. 11 depicts an illustrative flow diagram depicting special purpose instructions for use in provision of the smart power regulation (internal charging from external charging feature) feature according to one embodiment of the present invention.

FIG. 11. Automatic Flow of Charging Internal from External

Further to the above, FIG. 11 details the (automatic) flow of charging internal battery from external battery. Specifically, sled 101 starts to charge internal battery 701 at 1120 if external battery pack is connected 1101 and internal battery level is under threshold 1110. Sled 101 stops charging internal battery 701 at 1130 if the detected internal battery level is above a predetermined threshold 1130.

While the present invention has been described fully and completely with certain emphasis upon illustrative embodiments, it should be understood that within the scope of the appended claims, the invention may be practiced otherwise than as specifically described herein.

I claim:

1. A modular sled for cooperative power management and physical combination between a mobile device and associated peripheral devices, said sled comprising:
    (a) a rigid backbone structure;
    (b) a power balancing module;
    (c) an intelligent cooperative power regulator for charging of, and drawing of, power from said power balancing module;
    (d) wherein said backbone structure includes a means for attachment of a mobile device and a separate means of attachment for at least one associated peripheral device;
    (e) wherein said intelligent cooperative power regulator includes a power connectivity module with special purpose circuitry for simultaneous cooperative power connection between said mobile device and said at least one associate peripheral device;
wherein said special purpose circuitry includes:
    (i) circuitry for receiving and identifying at least one mobile device selected from various mobile devices;
    (ii) circuitry for identifying a charging path of said at least one mobile device;
    (iii) a battery checking circuit connected with said at least one mobile device for:
identifying battery capacity of said at least one mobile device;
    said power balancing module converting signals received from said
        at least one mobile device selected from various mobile devices into special purpose instructions for cooperative power management between said mobile device and said at least one associate peripheral device via said intelligent cooperative power regulator; said power balancing module
        identifying a charging path of said at least one mobile device and identifying battery capacity of said at least one mobile device.

2. The modular sled of claim 1, wherein said at least one associate peripheral device comprises a variable position passport reader with variable OCR structure.

3. The modular sled of claim 2, further including a power balancing module, said power balancing module including circuitry for balancing a smart device battery power level, a sled battery power level and an external battery power level to prevent uneven battery drain.

4. The modular sled of claim 3, further including a hibernation module.

\* \* \* \* \*